(12) United States Patent
Brosnan

(10) Patent No.: US 10,311,692 B2
(45) Date of Patent: Jun. 4, 2019

(54) METHOD AND INFORMATION SYSTEM FOR SECURITY INTELLIGENCE AND ALERTS

(71) Applicant: Patrick J. Brosnan, West Nyack, NY (US)

(72) Inventor: Patrick J. Brosnan, West Nyack, NY (US)

( * ) Notice: Subject to any disclaimer, the term of this patent is extended or adjusted under 35 U.S.C. 154(b) by 0 days.

(21) Appl. No.: 15/963,933

(22) Filed: Apr. 26, 2018

(65) Prior Publication Data

US 2018/0315283 A1 Nov. 1, 2018

Related U.S. Application Data

(60) Provisional application No. 62/492,086, filed on Apr. 28, 2017.

(51) Int. Cl.
*G08B 21/02* (2006.01)
*G08B 25/08* (2006.01)
*G08B 25/14* (2006.01)
*G06F 16/2458* (2019.01)

(52) U.S. Cl.
CPC ......... *G08B 21/02* (2013.01); *G06F 16/2465* (2019.01); *G08B 25/08* (2013.01); *G08B 25/14* (2013.01); *G06F 2216/03* (2013.01)

(58) Field of Classification Search
CPC . G06F 16/2465; G06F 2216/03; G08B 21/02; G08B 25/08; G08B 25/14
See application file for complete search history.

(56) References Cited

U.S. PATENT DOCUMENTS

| 8,384,542 B1 * | 2/2013 | Merrill | G08B 25/004 340/426.1 |
| 2017/0316421 A1* | 11/2017 | Xu | G06Q 30/018 |
| 2018/0315283 A1* | 11/2018 | Brosnan | G08B 25/08 |

* cited by examiner

*Primary Examiner* — Omeed Alizada
(74) *Attorney, Agent, or Firm* — R. Tracy Crump

(57) ABSTRACT

The method and information system provides for receiving, verifying, analyzing, and monitoring data streams from various news feeds, web services and social media posts to alert and coordinate security services of possible terrorist events, major crimes, active shooters, public protests and other developing incidents. The method and information system provides for the transmission of real-time actionable intelligence instantaneously directly to security service personnel through SMS messaging using smart phone and similar mobile devices. Based on the relevant intelligence transmitted through SMS messages on smart phones and devices, individual security personnel can be coordinated and instructed to revise post orders, lock down doors or call for backup to provide timely responses to help ensure the safety and security of the assets and personnel they are contracted to protect.

5 Claims, 3 Drawing Sheets

METHOD AND INFORMATION SYSTEM FOR SECURITY INTELLIGENCE AND ALERTS

This application claims the benefit of U.S. Provisional Application No. 62/492,086 filed Apr. 28, 2017, the disclosure of which is hereby incorporated by reference.

This invention relates to a method and information system for monitoring, analyzing, and verifying information relevant to security operations from social media, news reports and other sources to alert and coordinate security services in the protection of individuals, businesses and governmental agencies.

BACKGROUND AND SUMMARY OF THE INVENTION

When unexpected events occur, such as armed robbery, the terrorist attacks, street riots, fires, or other significant incidents that threaten people, communities and businesses, security personnel need to immediately understand and manage the circumstances, dangers and threats of such events in order to properly respond and safe guard those involved and impacted. The costs of not having accurate, verified and timely information immediately available to not only the on-site security personnel, first responders, and the control elements that deploy, control and coordinate their collective response to critical events, but also to the management of affected private businesses, can be potentially devastating.

The method and information system of this invention receives, monitors, analyzes and verifies data streams from various news feeds, web services and social media posts to alert and coordinate security services of possible terrorist events, major crimes, active shooters, public protests and other developing incidents. The method and information system provides for the transmission of real-time actionable intelligence instantaneously directly to security service personnel through SMS messaging using smart phones and similar mobile devices. Based on the relevant intelligence transmitted through SMS messages on smart phones and devices, individual security personnel can be coordinated and instructed to revise post orders, lock down doors or call for backup to provide timely responses to help ensure the safety and security of the assets and personnel they are contracted to protect.

The above described features and advantages, as well as others, will become more readily apparent to those of ordinary skill in the art by reference to the following detailed description and accompanying drawings.

BRIEF DESCRIPTION OF THE DRAWINGS

The present invention may take form in various system and method components and arrangement of system and method components. The drawings are only for purposes of illustrating exemplary embodiments and are not to be construed as limiting the invention. The drawings illustrate the present invention, in which.

DESCRIPTION OF THE PREFERRED EMBODIMENT

In the following detailed description of the preferred embodiments, reference is made to the accompanying drawings that form a part hereof, and in which is shown by way of illustration specific preferred embodiments in which the invention may be practiced. These embodiments are described in sufficient detail to enable those skilled in the art to practice the invention, and it is understood that other embodiments may be utilized and that logical, structural, mechanical, electrical, and systematic changes may be made without departing from the spirit or scope of the invention. To avoid detail not necessary to enable those skilled in the art to practice the invention, the description may omit certain information known to those skilled in the art. The following detailed description is, therefore, not to be taken in a limiting sense, and the scope of the present invention is defined only by the appended claims.

Information System

Figure 1:
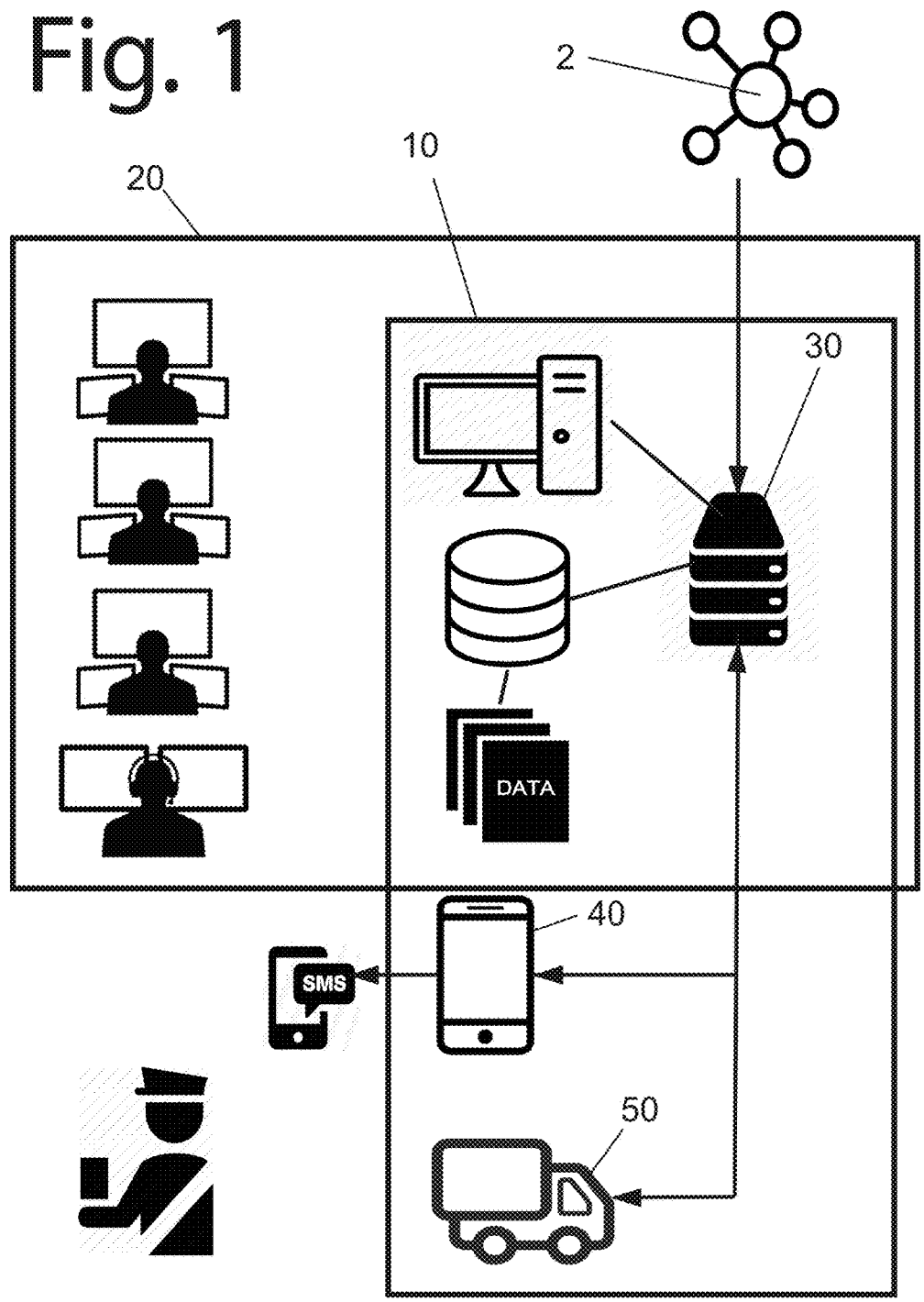
FIG. 1 is a simplified depiction of the components and layout of the information system of this invention.

Referring now to the drawings, FIG. 1 is a simplified schematic of an exemplary information system of this invention, which is designated generally as reference numeral 10. The information system 10 is an integrated telecommunication system that includes system hardware 30 located and operated at a central command facility 20 and a plurality of handheld mobile smart devices 40 carried by individual security personnel and first responders and a variety of system software applications. Information system 10 allows operations personnel to receive, monitor, coordinate and analyze incoming information from the various external information sources to inform and coordinate security personnel and first responders in response to developing threats and events. Command facility 20 is staffed with intelligence analysts and security professional that use information system 10 and integrate real-time human intelligence aspects to incoming information received from external sources and response decisions and actions.

System hardware 30 may include computer mainframes, PCs, laptops, terminals, user interfaces, data storage and backup equipment, databases, data compilers, network servers, routers, switches, and other communication equipment, all of which are well known and understood in the arts, but not necessarily depicted in the drawings. Smart Devices 40 may include cellular telephones, tablets, laptops, and other handheld or mobile communication devices carried by the Clients' security personnel and first responders. System hardware 30 and mobile smart devices 40 are operatively integrated for real-time telecommunication through multiple redundant telecommunication systems and platforms.

Information system 10 also includes systems software applications and data structures that allow operational personnel to view and manipulate received information and for the organized storage, classification, and reporting relevant data derived from the received information, as well as the transmission of certain information to select security personnel, first responders and other external parties. Information system 10 also incorporates the use of certain smart device functions, such as camera, and GPS mapping and navigation so that security personnel and first responders can directly update information within the systems.

Information system 10 is operatively connected to the internet and other wire services to receive information in the form of event alerts from various news service outlets, such as Dataminr and Breaking News Network (BNN). Dataminr, headquartered in New York, transforms real-time data from Twitter and other public sources into actionable alerts, identifying the most relevant information in real-time for clients in Finance, the Public Sector, News, Corporate Security, and Crisis Management. Dataminr identifies, classifies, and determines the significance of real-time information and delivers relevant alerts and verification analytics through high-value applications. Breaking News Network (BNN) is a full-time, dedicated, incident notification system. BNN has a 24 hour news desk staffed by human professionals, as well as participation from many public safety agencies and personnel, most major media outlets, news reporters and photographers, and commercial insurance professionals.

Once an event alert is received at the command center, specialized operations personnel and intelligence analysts, determine the viability of information contained in the event alert and evaluate the legitimacy of the source. Often the analysts will cross reference information from multiple sources against one another to verify information legitimacy and accuracy. Once verified as a legitimate and relevant event or threat, the analyst creates an event profile within information systems that is stored in data sets within the system. Next, Analysts use the information system to reference and pin point the physical location for an event alert to determine the physical proximity to any clients. The physical location is noted and added to the event profile within the information system. The analysts also use the information system to determine the affect of any particular event alert on a given client based on the nature of the event and its physical proximity to that client, which is also noted in the event profile. If the alert is deemed relevant to a given client, the analyst will trigger the information system to send out an "Alert Notice" generally in the form of an SMS message sent to the smart devices of specific security personnel and client administers notifying them of the event alert. Each Alert Notice is logged within the event profile in information system 10. If the event is for an ongoing incident, the analyst will use information system 10 to continue to monitor the situation and send updated alert notices until the incident is finished. Once the incident is complete, the analyst triggers information system 10 to create an after-action report logging all alerts, actions and communications associated with the event.

Information system 10 can also be used with or integrated with other security related information systems and services, such as the GXP Platform provided by the Rodgers Group, LLC., of Island Heights, N.J. The GPX Platform integrates digital geographic maps, structural floor plans and emergency action plans with the GPS capabilities of smart devices to provide a vehicle for tracking and coordinating security personnel and first responders within a real-time common response grid. The GPX Platforms also allows security personnel and first responders in the field to use smart devices to upload geo-tagged photographs, videos and data about a security event that is integrated and disseminated to other security personnel and first responders.

Information system 10 is also designed to receive live audio/video feeds from on-sight reconnaissance vehicles and personnel 50, such as Brosnan Smart Trucks, available through Brosnan Risk Consultants, Ltd of New York, N.Y., as well as feedback from security assets using their individual smart devices. On-sight reconnaissance vehicles 50 and additional security personnel can directly upload real-time audio/video and relevant event information directly into information system 10, which is then analyzed, coordinated and pushed back out to security assets in the field. On-sight reconnaissance vehicles 50 are generally specially equipped vehicles with multiple high resolution video cameras, audio recording equipment and telecommunication and broadcast equipment that can quickly process and send live audio/video feeds to command facility 20 or directly to the smart devices of select security assets using multiple redundant communication platforms. The on-site reconnaissance vehicles 50 have two-way communication directly with command facility 20 and can be directed to developing threat and event locations.

Method

Figure 2:
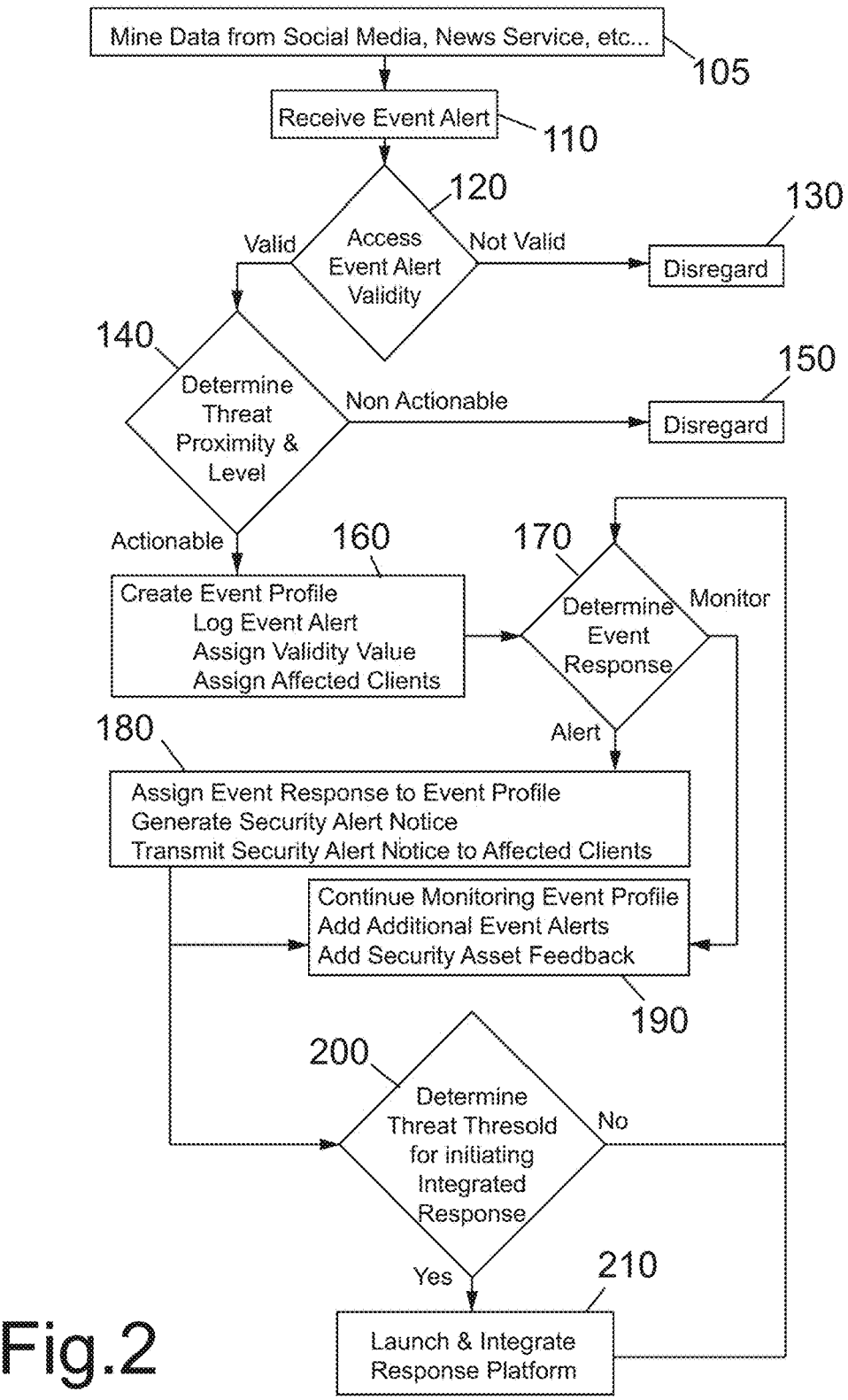
FIG. 2 is a logic flow chart of the method using the information system.

FIG. 2 is a logic chart of the method for using information system 10 at the command facility 20 to receive, monitor, coordinate and analyze incoming information from the various external information sources and to inform and coordinate security personnel and first responders. With the description of the method and information systems of this invention, certain terms will have the following meanings:

"Event" is a real world security event.

"Event Alert" is a news notification, on-line/social media post, Client notification, or other notification relating to an Event.

"Event Log" is a data set of Event Profiles. Each Event Profile is a record in the Event Log.

"Event Profile is an information file, print or digital of all relevant information relating to an Event. Each Event Profile is a record in the Event Log and contains the following fields and data sets or tables: Event No., Validity Level, Affected Client Table (queried from the Client Table), Event Location & Physical Mapping, Threat Level, Response Action, Status, Last Action, etc. . . .

"Event Alert Log" is a data set or table linked to the Event Profile Table and a collection of all Event Alerts relating to a given Event Profile. Each Event Alert is a record in the Event Alert Log and contains the following fields: Alert No., Alert Date, Alert Time, Alert Validity Level, Source, Event No., Alert Category, and Notes.

"Client Data set" is a general data set of client information, particularly geographic information used to determine the client's proximity and relevance to an Event.

"Alert Notice" is an SMS or similar message generated in response to an Event. An Alert Notice contains relevant information regarding an Event including, Icon, Event Type, who, what, where, when & other details.

As shown in FIG. 2, the method of operation 100 and use of information system 10 begins with the monitoring of real-time news for events and threats from various information sources (Step 105). Event news in the form of an Event Alert is received electronically at the command facility 20 through information system 10 from any on-line or broadcast news services, social media, or other intelligence services (Step 110). Each Event Alert received is analyzed by command facility personnel and analysts to determine the validity of the Event Alert (Step 120). At the command facility human analysts cross reference and verify every Event Alert against multiple internal and external intelligence and news sources to authenticate the source of the Event Alert source and its underlying facts.

If invalid, the Event Alert is discarded and no further action is taken (Step 130). If the Event Alert is valid, the human analysts or information system 10 identifies the physical location and proximity of the event or threat of the Event Alert to the physical location of existing and relevant clients and determines the threat level for the Event Alert (Step 140). If the event or threat of a given Event Alert is geographically unlikely to have any affect on the security of any client operations or assets, the Event Alert is deemed "non-actionable" and again discarded with no further action taken (Step 150).

If the event or threat of a given valid Event Alert is of a certain threat level and/or within a predetermined physical proximity of any client operations or assets, the Event Alert is deemed "actionable" and the human analyst triggers information system 10 to create an Event Profile for the event or threat of the Event Alert (Step 160). Event Profiles are stored as a data set within information system 10 for each valid and actionable Event Alert. Event Profiles include all relevant information relating to the event or threat of a given Event Alert, including a validity value, which is a human analyst determined or system generated value reflecting the authenticity of the source of the Event Alert. The Event Profiles are also mapped to Client data so that the specific clients that may be affected by the particular event or threat are linked or assigned to each particular Event Profile. The Event Profiles also include a log or listing of all subsequent or additional Event Alerts that pertain to a given event or threat. Once an Event Profile is created, human analysts determine the appropriate event response at that particular time to the given event or threat (Step 170). Alternatively, information system 10 can be programmed to automatically initiate event responses based on predetermined criteria for each client with respect to the nature and proximity of the event or threat.

Figure 3:
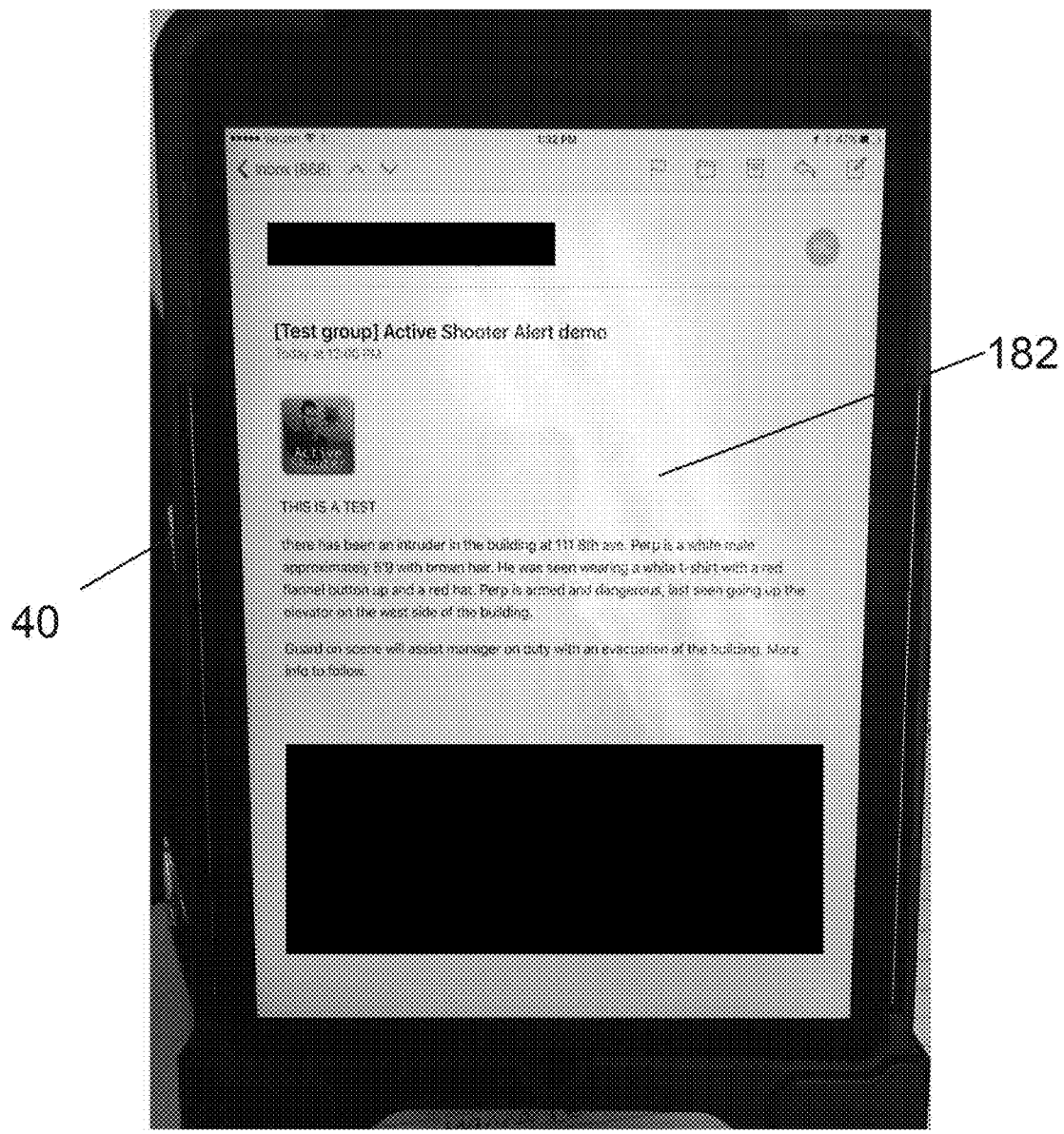
FIG. 3 is a photograph of a smart device and alert notice.

If the appropriate event response to a given Event Alert is to inform and or provide action instructions to affected clients and their security personnel, the human analysts trigger or information system 10 automatically assigned based on predetermined criteria, a response level and response actions to the Event Profile, generate a Security Alert Notice and transmit the Security Alert Notice 182 to the affected clients, security personnel and first responders as identified in the Event Profile (Step 180). Security Alert Notices are written by human analysts or automatically generated by information system 10. Once the Security Alert Notice is generated, information system 10 transmits the Security Alert Notice 182 to all affected clients, security personnel and first responders using SMS text messaging, email or other type of peer-to-peer telecommunication platform sent to individual smart devices 40 (FIG. 3). If the appropriate event response to the given Event Alert is simply to monitor the situation, the human analysts trigger or information system 10 posts all relevant data and information to select monitor screens and work stations within the command facility to allow analysts to visually monitor, track and analyze the details of the given event or threat (Step 190). Any subsequent and additional Event Alerts received for a given event or threat are similarly processed through Steps 110-160 and logged into the Event Profile. It should be noted that security personnel and first responders in the field carrying a smart device can generate and transmit subsequent feedback from Alert Notices 182 from the smart device for a given event or threat, which would be similarly processed by information system 10 and added to the Event Profile (Step 190). Consequently, information system 10 continuously updates and informs all users about relevant developments for a given event or threat with limited information lag.

Lastly, the human analysts determine if the event or threat of a given Event Alert requires initiating outside or third party notification and coordination as part of an integrated emergency response (Step 200). If the event or threat does not rise to such a threshold, information system 10 simply continues to monitor the event or threat until resolution and the Event Profile is closed within the system. If the event or threat dictates an integrated response, information system 10 initiates and launches direct communication and integration with the response platform and/or information systems of police, fire, emergency management, and civil and governmental administration and other outside security systems (Step 210). For example, information system 10 may be triggered to automatically launch and integrate with the GPX platform allowing the data from an Event Profile to be instantly accessible on the smart devices of other security personnel and first responders with Information system 10 and the GPX platform. Information system 10 may also trigger a reconnaissance vehicle to move the threat or event location to provide on-site, real-time intelligence and feedback.

It should be apparent from the foregoing that an invention having significant advantages has been provided. While the invention is shown in only a few of its forms, it is not just limited but is susceptible to various changes and modifications without departing from the spirit thereof. The embodiment of the present invention herein described and illustrated is not intended to be exhaustive or to limit the invention to the precise form disclosed. It is presented to explain the invention so that others skilled in the art might utilize its teachings. The embodiment of the present invention may be modified within the scope of the following claims.

I claim:

1. A method for using an information system for monitoring threat events using broadcast news, on-line news services, social media and other intelligence sources to alert and coordinate security personnel and first responders where the information system includes internet connected computer hardware, computer memory operatively connected to the computer hardware, telecommunication equipment connected to and integrated with the computer hardware, and information management software having data structures stored within the computer memory and run on the computer hardware to input, organize and manage information relating to the threat events, the information system also includes a client data set of client information, such as information regarding client location and client security assets, an event data set of threat event information such as event location, event type, response actions, the method comprises:
   a) Mining broadcast news, wire and on-line news services and social media sites for threat event alerts;
   b) Accessing each of the threat event alerts for validity including cross referencing event alerts against multiple information sources;
   c) Determining the threat level and the physical proximity of the threat event to any clients for each threat event alert;
   d) Disregarding invalid threat event alerts;
   e) Creating event profiles in event data sets for each valid threat alert;
   f) Adding all clients affected by the threat event to the event profile of each threat event;
   g) Determining an appropriate event response to the threat event for each client affected by the threat event;
   h) Assigning the determined event response to the event profiles;
   i) Generating and transmitting a security alert notice to all the clients and security personnel;
   j) Determining the threshold for integrated threat response; and
   k) Launching integrated threat response.

2. The method of claim 1 wherein the step d) includes assigning a validity value for the event alert in the event profile.

3. The method of claim 1 and step l) generating a report for each event profile.

4. The method of claim 1 wherein step h) includes selecting event responses from a predetermined list of actions.

5. The Method of claim 1 wherein step d) includes mapping the physical location of each client against the physical location of the threat event in each event alert.

* * * * *